United States Patent
Hanai et al.

(10) Patent No.: US 10,753,756 B2
(45) Date of Patent: Aug. 25, 2020

(54) METHOD OF DETERMINING ROUTE, INFORMATION PROCESSING APPARATUS, AND NON-TRANSITORY STORAGE MEDIUM STORING PROGRAM

(71) Applicant: TOYOTA JIDOSHA KABUSHIKI KAISHA, Toyota-shi, Aichi-ken (JP)

(72) Inventors: Miharu Hanai, Obu (JP); Daisuke Higashi, Tokyo (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/034,996

(22) Filed: Jul. 13, 2018

(65) Prior Publication Data

US 2019/0033086 A1 Jan. 31, 2019

(30) Foreign Application Priority Data

Jul. 27, 2017 (JP) .................. 2017-145795

(51) Int. Cl.
  *G01C 21/34* (2006.01)
  *G01C 21/36* (2006.01)

(52) U.S. Cl.
  CPC ..... *G01C 21/3461* (2013.01); *G01C 21/3415* (2013.01); *G01C 21/367* (2013.01); *G01C 21/3484* (2013.01)

(58) Field of Classification Search
  CPC ............ G01C 21/3415; G01C 21/3461; G01C 21/3484; G01C 21/367
  See application file for complete search history.

(56) References Cited

U.S. PATENT DOCUMENTS

| | | | | |
|---|---|---|---|---|
| 5,406,491 A | * | 4/1995 | Lima .................. | G01C 21/3415 340/990 |
| 5,652,706 A | * | 7/1997 | Morimoto .......... | G01C 21/3415 340/460 |
| 6,437,688 B1 | * | 8/2002 | Kobayashi ........... | G01S 15/931 180/167 |
| 7,203,598 B1 | * | 4/2007 | Whitsell ................ | G01C 21/26 340/988 |
| 8,781,716 B1 | * | 7/2014 | Wenneman ........ | G01C 21/3484 701/118 |
| 8,935,036 B1 | * | 1/2015 | Christensen .......... | H04W 4/029 701/29.1 |
| 9,129,449 B2 | * | 9/2015 | Davidson ............... | G07B 15/06 |
| 9,222,795 B1 | * | 12/2015 | Gerlach ............. | G01C 21/3632 |
| 9,234,765 B1 | * | 1/2016 | Padovitz ................ | G01C 21/20 |
| 9,841,286 B1 | * | 12/2017 | Hayward ............. | G05D 1/0214 |
| 2003/0023375 A1 | * | 1/2003 | Yoshida ............. | G01C 21/3461 701/455 |

(Continued)

FOREIGN PATENT DOCUMENTS

JP 2000111354 A 4/2000

*Primary Examiner* — Babar Sarwar
(74) *Attorney, Agent, or Firm* — Hunton Andrews Kurth LLP

(57) ABSTRACT

A method of determining a route includes searching for an initial route as a guidance route from a departure place to a destination, designating an avoidance route as an unfavorable route for a passage of a user, and in a case where the avoidance route is included in the initial route, outputting a changed route obtained by changing the avoidance route included in the initial route to another route.

11 Claims, 11 Drawing Sheets

(56) References Cited

U.S. PATENT DOCUMENTS

| | | | |
|---|---|---|---|
| 2004/0143387 A1* | 7/2004 | Shimizu | G01C 21/3415 701/414 |
| 2004/0172192 A1* | 9/2004 | Knutson | G01C 21/3415 701/468 |
| 2005/0234640 A1* | 10/2005 | Hiyokawa | G01C 21/3415 701/414 |
| 2007/0010941 A1* | 1/2007 | Marsh | G01C 21/3415 701/533 |
| 2007/0054685 A1* | 3/2007 | Kellum | G01S 13/931 455/517 |
| 2007/0225900 A1* | 9/2007 | Kropp | G01C 21/3461 701/418 |
| 2008/0077309 A1* | 3/2008 | Cobbold | G06Q 10/10 701/117 |
| 2008/0147313 A1* | 6/2008 | Nesbitt | G01C 21/367 701/426 |
| 2009/0005962 A1* | 1/2009 | Shinto | G01C 21/3415 701/532 |
| 2009/0316671 A1* | 12/2009 | Rolf | H04W 4/029 370/338 |
| 2011/0060523 A1* | 3/2011 | Baron | G01C 21/3415 701/530 |
| 2013/0035850 A1* | 2/2013 | He | G01C 21/3461 701/425 |
| 2013/0218449 A1* | 8/2013 | Hymel | G01C 21/3461 701/408 |
| 2015/0179062 A1* | 6/2015 | Ralston | G01C 21/26 701/117 |
| 2018/0017406 A1* | 1/2018 | Semnani | G01C 21/3676 |
| 2018/0283895 A1* | 10/2018 | Aikin | G01C 21/3415 |
| 2019/0033092 A1* | 1/2019 | Yang | G01C 21/34 |
| 2019/0113360 A1* | 4/2019 | Jin | G01C 21/3661 |

\* cited by examiner

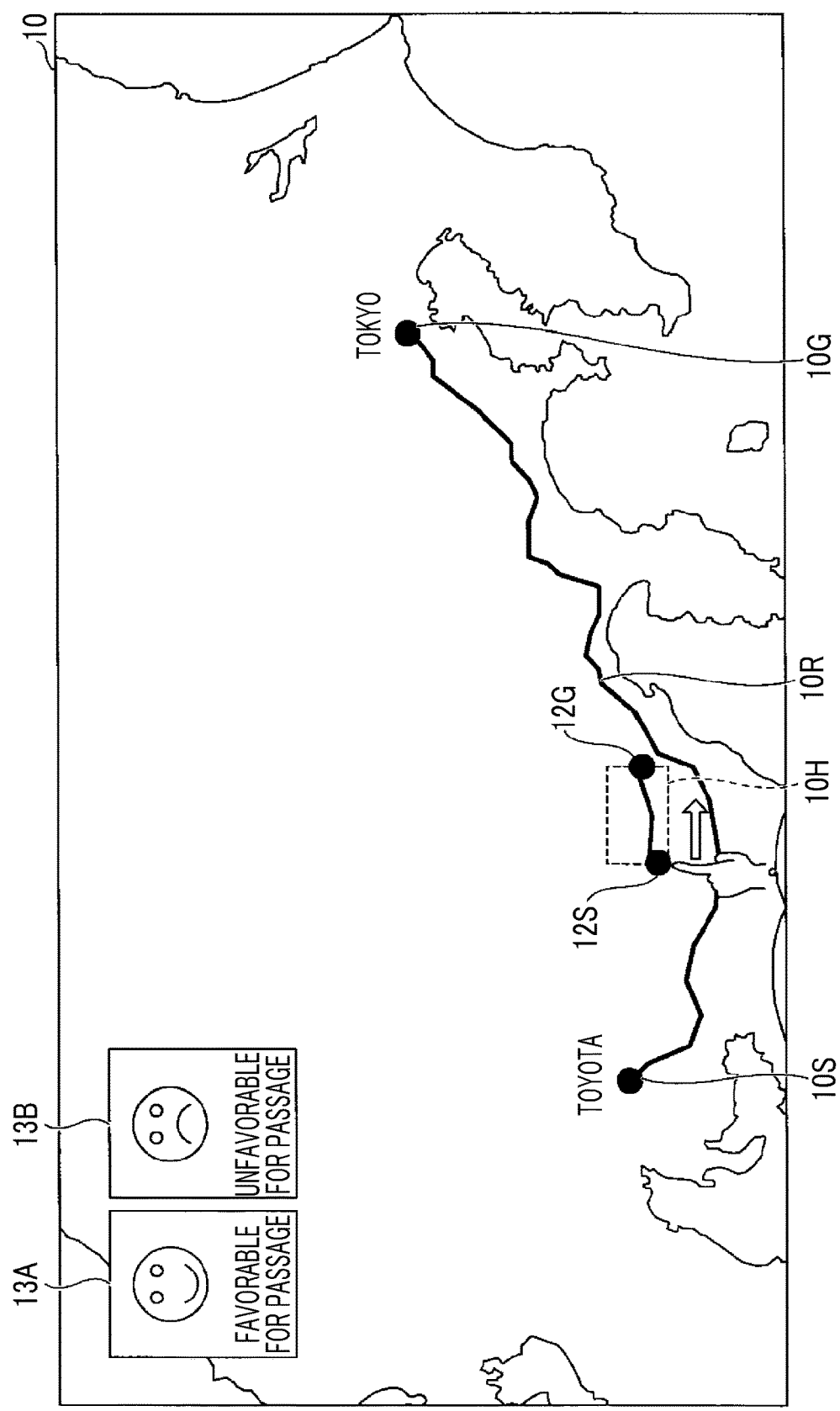

METHOD OF DETERMINING ROUTE, INFORMATION PROCESSING APPARATUS, AND NON-TRANSITORY STORAGE MEDIUM STORING PROGRAM

INCORPORATION BY REFERENCE

The disclosure of Japanese Patent Application No. 2017-145795 filed on Jul. 27, 2017 including the specification, drawings and abstract is incorporated herein by reference in its entirety.

BACKGROUND

1. Technical Field

The present disclosure relates to a method of determining a route, an information processing apparatus, and a non-transitory storage medium storing a program.

2. Description of Related Art

A technique that performs so-called navigation to search for and guide a route from a departure place to a destination in in-vehicle equipment, a portable terminal, or the like is known.

For example, a display device displays a map on a display screen provided with a touch switch. A user traces a favorable route for a passage among all routes to the destination on the map on the screen with a finger. A route setting device sets a route to the destination with a traced trajectory as a passage route with priority. In this way, a method that allows a user to easily and appropriately set a route to a destination including a favorable route for a passage of the user is known (for example, Japanese Unexamined Patent Application Publication No. 2000-111354 (JP 2000-111354 A) or the like).

SUMMARY

However, in the related art, there is a problem in that, even though there is an unfavorable route for the passage of the user, a route (hereinafter, referred to a "guidance route") from a departure place to a destination including the unfavorable route for the passage of the user is determined.

The disclosure provides a method of determining a route, an information processing apparatus, and a non-transitory storage medium storing a program that determine a guidance route taking into consideration an unfavorable route for a passage of a user.

A first aspect of the disclosure relates to a route determining method including searching for an initial route as a guidance route from a departure place to a destination, designating an avoidance route as an unfavorable route for a passage of a user, and in a case where the avoidance route is included in the initial route, outputting a changed route obtained by changing the avoidance route included in the initial route to another route.

A second aspect of the disclosure relates to an information processing apparatus including a computer configured to search for an initial route as a guidance route from a departure place to a destination, designate an avoidance route as an unfavorable route for a passage of a user, and in a case where the avoidance route is included in the initial route, output a changed route obtained by changing the avoidance route included in the initial route to another route.

A third aspect of the disclosure relates to a non-transitory storage medium storing a program for causing a computer to execute a method of determining a route. The program causes the computer to execute searching for an initial route as a guidance route from a departure place to a destination, designating an avoidance route as an unfavorable route for a passage of a user, and in a case where the avoidance route is included in the initial route, outputting a changed route obtained by changing the avoidance route included in the initial route to another route.

With the above configuration, first, in the method of determining a route that the information processing apparatus or in-vehicle equipment performs, the initial route as the guidance route from the departure place to the destination is searched. In the method of determining a route, the avoidance route as the unfavorable route for the passage of the user is designated. As described above, in a case where the avoidance route is designated, in the method of determining a route, the changed route where the avoidance route is excluded from the initial route can be generated. As described above, the method of determining a route is a method capable of determining as the guidance route, the changed route taking into consideration such that the unfavorable route for the passage of the user is excluded.

In the method of determining a route, in a case where the avoidance route or the like is output based on an operation of tracing the map, the user can input the avoidance route with an intuitively understandable operation.

It is possible to determine a guidance route taking into consideration an unfavorable route for a passage of a user.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a diagram showing an example where a passage route is input to the information processing apparatus according to the embodiment of the disclosure;

DETAILED DESCRIPTION OF EMBODIMENTS

Hereinafter, an embodiment of the disclosure will be described referring to the accompanying drawings.

Hardware Configuration Example

A method of determining a route according to the embodiment of the disclosure is executed by, for example, an information processing apparatus, such as a smartphone, a mobile phone, a tablet, or a personal computer (PC). The method of determining a route according to the embodiment of the disclosure may be executed by, for example, in-vehicle equipment, such as a car navigation device (Automotive navigation system). Hereinafter, an example where a smartphone 100 is used will be described.

The smartphone 100 has, for example, a hardware configuration having hardware resources, such as an arithmetic device, a control device, an input/output device, a communication device, a storage device, and an interface.

Specifically, the arithmetic device and the control device are, for example, a central processing unit (CPU), a micro processing unit (MPU), or the like. The input/output device is, for example, a touch panel or the like. The input/output device may have a hardware configuration in which an input device and an output device are separated. The communication device is a device that transmits and receives data to and from an external device, such as a server, through a network in a wired or wireless manner. The storage device is, for example, a main storage device, such as a memory. The storage device may include an auxiliary storage device, such as a hard disk or a solid state drive (SSD). The interface is, for example, a connector, an antenna, or the like. The interface is a device that transmits and receives data to and from the external device.

The hardware configuration is not limited to the configuration described above. For example, the smartphone 100 may have a hardware configuration having an arithmetic device, a control device, or a storage device on the inside or outside thereof.

First Overall Processing Example

Figure 1:
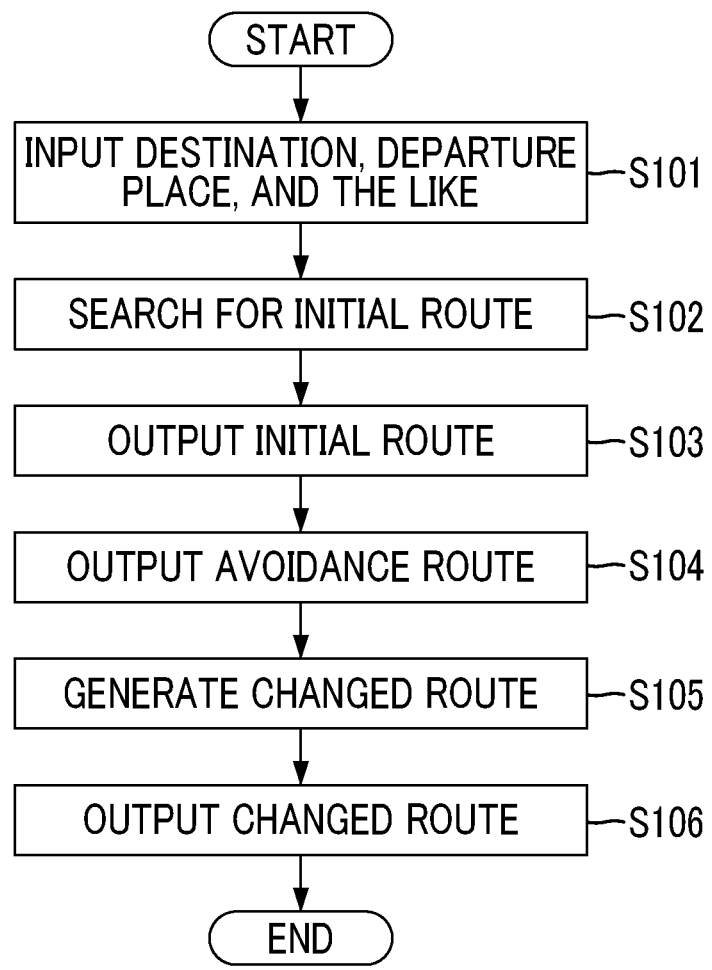
FIG. 1 is a flowchart showing an example of first overall processing in an information processing apparatus according to an embodiment of the disclosure.

FIG. 1 is a flowchart showing an example of first overall processing in an information processing apparatus according to the embodiment of the disclosure. The smartphone 100 can acquire map data from the external device before or during the processing shown in the drawing.

In Step S101, the smartphone 100 receives a destination 10G a departure place 10S, and the like as input. For example, the name, coordinates, or address of the destination 10G or an operation of a user 50 indicating a position on a map 10 is input to the smartphone 100. The departure place 10S is input similarly to the destination 10G for example. The smartphone 100 may further receive via-points on the way from the departure place 10S to the destination 10G with the same input method as the destination 10G the departure place 10S, and the like as input.

In Step S102, the smartphone 100 searches for a route from the departure place 10S to the destination 10G. Hereinafter, the route searched in Step S102 is referred to as an "initial route 10R". The smartphone 100 can use map data and can search for a route with map data, a route search algorithm, and the like.

In Step S103, the smartphone 100 outputs the initial route 10R. For example, the smartphone 100 outputs the initial route 10R as follows.

Figure 2:
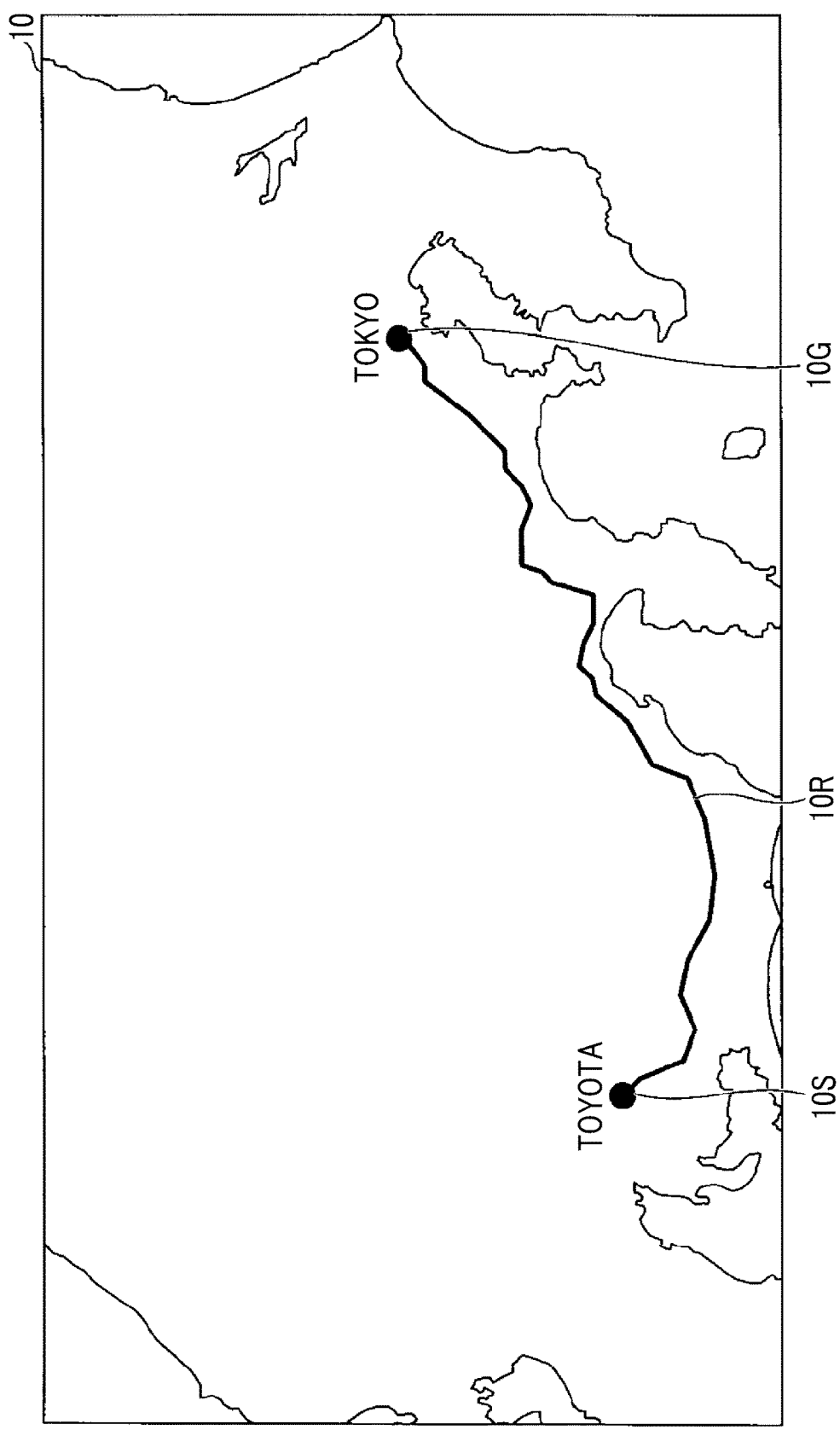
FIG. 2 is a diagram showing an example of an initial route that is displayed by the information processing apparatus according to the embodiment of the disclosure.

FIG. 2 is a diagram showing an example of the initial route 10R that is displayed by the information processing apparatus according to the embodiment of the disclosure. For example, in Step S103, the smartphone 100 displays the map 10 as shown in the drawing on a display. Then, in Step S101, for example, as shown in the drawing, it is assumed that the departure place 10S and the destination 10G are input. As described above, in a case where the departure place 10S and the destination 10G are determined, the smartphone 100 can display the initial route 10R to be a search result of Step S102 on the map 10 in an overlapping manner.

Hereinafter, in a case where the user 50 performs an operation of indicating any portion on the map 10 shown in the drawing, the smartphone 100 can specify a point on the map 10 with a touch panel or the like. In the following description, as shown in the drawing, the map 10 that shows the entire initial route 10R where both of the departure place 10S and the destination 10G are displayed has been described as an example; however, the map may be a map in which a part of the initial route 10R including a midpoint from the departure place 10S to the destination 10G is enlarged, or the like.

Returning to FIG. 1, in Step S104, the smartphone 100 outputs an avoidance route 10D. For example, the smartphone 100 ascertains an unfavorable route (hereinafter, referred to as the "avoidance route 10D") for a passage of the user 50 by inputting the following operation.

Figure 3:
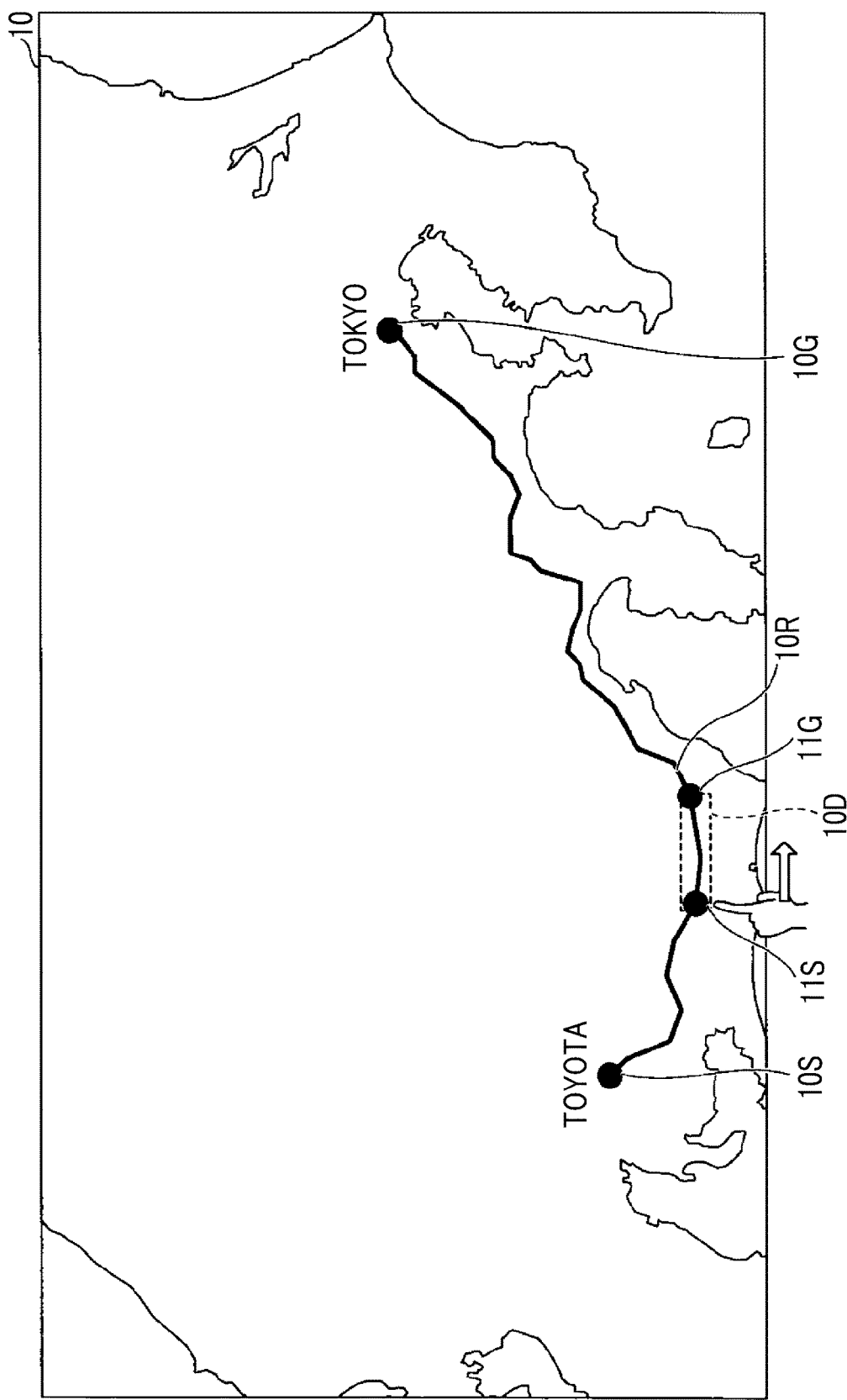
FIG. 3 is a diagram showing an example where an avoidance route is input to the information processing apparatus according to the embodiment of the disclosure.

FIG. 3 is a diagram showing an example where the avoidance route 10D is input to information processing apparatus according to the embodiment of the disclosure. Hereinafter, an example where the initial route 10R shown in FIG. 2 is searched will be described. In the initial route 10R shown in FIG. 3, it is assumed that the avoidance route 10D shown in the drawing is unfavorable for the passage of the user 50.

For example, the user 50 traces and inputs the avoidance route 10D on the map 10 with a finger. Specifically, first, as shown in the drawing, the user 50 places the finger at a position to be a start point (hereinafter, referred to as an "avoidance route start point 11S") of the avoidance route 10D on the map 10. As shown in the drawing, the user 50 traces a favorable portion for the avoidance route 10D with the finger to a position to be an end point (hereinafter, referred to as an "avoidance route end point 11G") of the avoidance route 10D. Next, in a case where the user 50 traces to the position to be the avoidance route end point 11G the user 50 releases the finger from the position to be the avoidance route end point 11G. In a case where the operation described above is input, the smartphone 100 can designate a route from the avoidance route start point 11S to the avoidance route end point 11G as the avoidance route 10D.

The avoidance route end point 11G is not limited as being designated by a so-called touch-off operation such that the position is designated by releasing the finger described above. For example, the avoidance route end point 11G may be designated by a so-called touch-on operation such that the position is designated in a case of being pressed with the finger for a predetermined time or more, or the like.

As above, it is desirable that a route is designated by a tracing operation. The tracing operation is an operation that is intuitively understandable by the user 50. Therefore, in a case where a route is designated based on the tracing operation, the smartphone 100 can improve operability.

The smartphone 100 may further designate a favorable route (hereinafter, referred to as a "passage route 10H") for the passage of the user 50. For example, the passage route 10H is designated by the same method as the avoidance route 10D, or the like. Specifically, the smartphone 100 ascertains the passage route 10H by inputting the following operation.

FIG. 4 is a diagram showing an example where the passage route 10H is input to the information processing apparatus according to the embodiment of the disclosure. Hereinafter, similarly to FIG. 3, the initial route 10R shown in FIG. 2 will be described as an example.

For example, in a case where the same operation as the avoidance route 10D shown in FIG. 3 is input, the passage route 10H can be designated. Specifically, the user 50 can input to the passage route 10H to the smartphone 100 by performing an operation of tracing from a position to be a start point (hereinafter, referred to as a "passage route 10H start point") of the passage route 10H to a position to be an end point (hereinafter, referred to as a "passage route 10H end point") of the passage route 10H.

A screen for inputting the passage route 10H, that is, a screen shown in FIG. 4, and a screen for inputting the avoidance route 10D, that is, a screen shown in FIG. 3 are switched by icons, for example. For example, in the example shown in FIG. 4, it is assumed that an icon (hereinafter, referred to as an "avoidance route icon 13B") for switching to the screen for inputting the avoidance route 10D and an icon (hereinafter, referred to as a "passage route icon 13A") for switching to the screen for inputting the passage route 10H are displayed on the screen. In a case where an operation of pressing the avoidance route icon 13B is input, the smartphone 100 is switched from the screen shown in FIG. 4 to the screen shown in FIG. 3. Similarly, in a case where an operation of pressing the passage route icon 13A is input on the screen shown in FIG. 3, or the like, the smartphone 100 is switched from the screen shown in FIG. 3 to the screen shown in FIG. 4.

Returning to FIG. 1, in Step S105, the smartphone 100 generates a route (hereinafter, referred to as a "changed route 30R") obtained by changing the initial route 10R. For example, as shown in FIG. 3, in a case where the avoidance route 10D is input, the smartphone 100 generates the changed route 30R as follows.

Figure 5A:
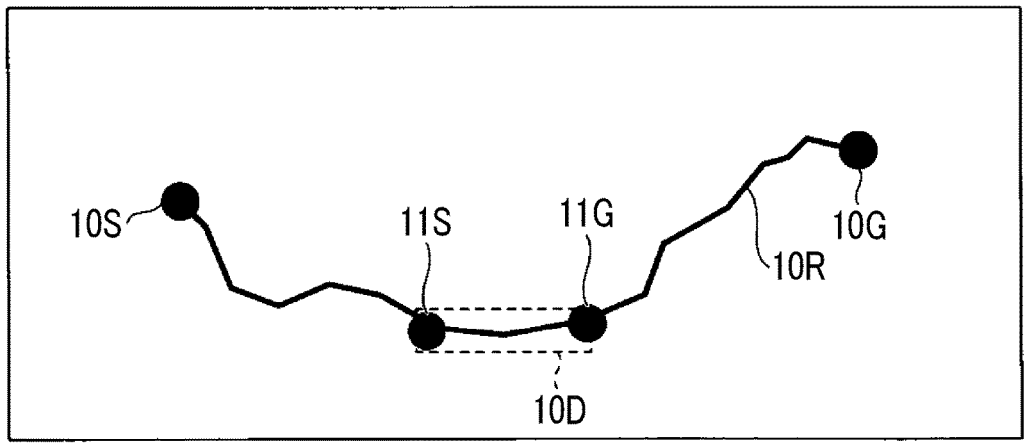
FIG. 5A is a diagram showing a generation example of a changed route in the information processing apparatus according to the embodiment of the disclosure.
Figure 5B:
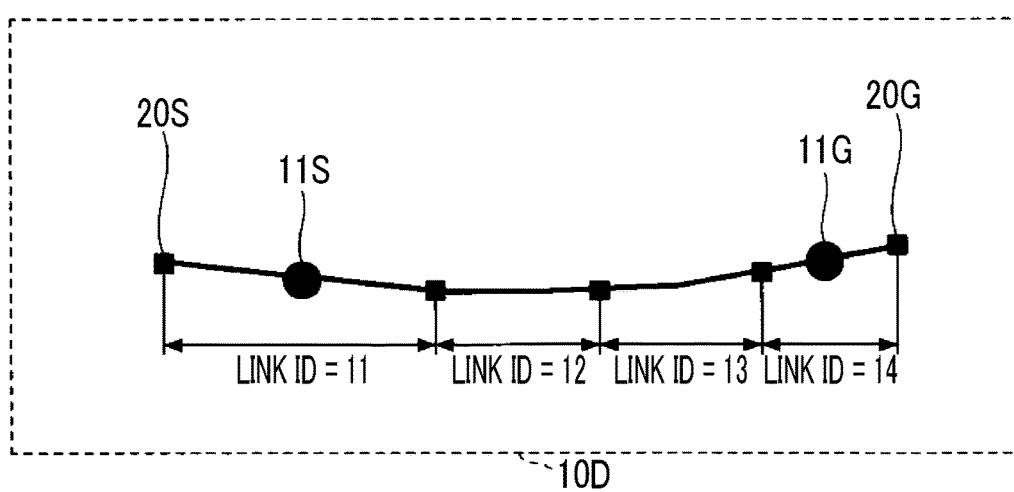
FIG. 5B is a diagram showing a generation example of a changed route in the information processing apparatus according to the embodiment of the disclosure.
Figure 5C:
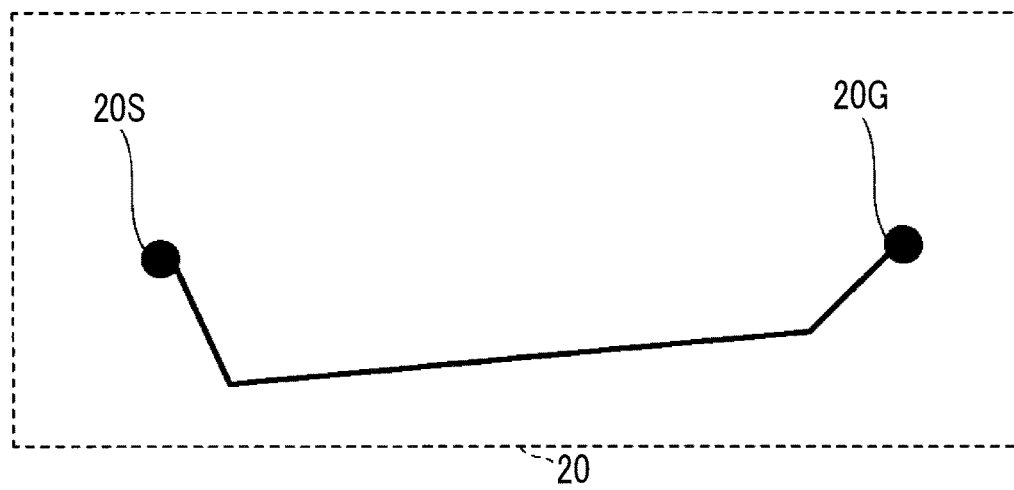
FIG. 5C is a diagram showing a generation example of a changed route in the information processing apparatus according to the embodiment of the disclosure.

FIGS. 5A, 5B and 5C are diagram showing a generation example of the changed route 30R in the information processing apparatus according to the embodiment of the disclosure. Hereinafter, an example where the initial route 1 OR shown in FIG. 5A is searched (Step S102), and the avoidance route 10D shown in FIG. 5A is designated (Step S104) will be described.

First, the smartphone 100 specifies the avoidance route 10D. Specifically, as shown in FIG. 5B, the smartphone 100 specifies a link including the avoidance route start point 11S.

The link is a road section located between nodes in a map. The link is specified by, for example, a link identification (ID) or the like. The link ID is a number or the like capable of specifying a road section in a road map. The node is a nodal point in a road network, and specifically, is an intersection or the like. That is, in a case where the link ID is known, the smartphone 100 can specify a target road on the map. Specifically, the links, the nodes, and the link IDs are elements on the map described in "http://www.drm.jp/database/expression.html" or the like.

In an example shown in FIG. 5B, the link including the avoidance route start point 11S is a link of "link ID=11". In the link of "link ID=11", a point closest to the departure place 10S is referred to as a "change start point 20S".

Similarly, the smartphone 100 specifies a link including the avoidance route end point 11G. In the example shown in FIG. 5B, the link including the avoidance route end point 11G is a link of "link ID=14". In the link of "link ID=14", a point closest to the destination 10G is referred to as a "change end point 20G".

In a case where a route is searched with the change start point 20S and the change end point 20G as a start point and an end point, as shown in FIG. 5B, the smartphone 100 can specify the avoidance route 10D. Specifically, the example shown in FIG. 5B is an example where a route constituted of "link ID=11" to "link ID=14" is searched. The smartphone 100 sets the avoidance route 10D specified as described above as a so-called avoiding route.

The smartphone 100 searches for a route where the avoidance route 10D is excluded. That is, for example, as shown in FIG. 5C, the smartphone 100 searches for a route (hereinafter, referred to as a "researched route 20") where "link ID=11" to "link ID=14" constituting the avoidance route 10D are not included among the routes from the change start point 20S to the change end point 20G. In this way, the smartphone 100 can specify the researched route 20 that bypasses the avoidance route 10D.

Returning to FIG. 1, in Step S105, the smartphone 100 generates the changed route 30R. Specifically, the smartphone 100 changes the initial route 10R shown in FIG. 2 to generate the changed route 30R where a halfway route becomes the researched route 20 searched in Step S104. For example, the changed route 30R is the following route.

Figure 6:
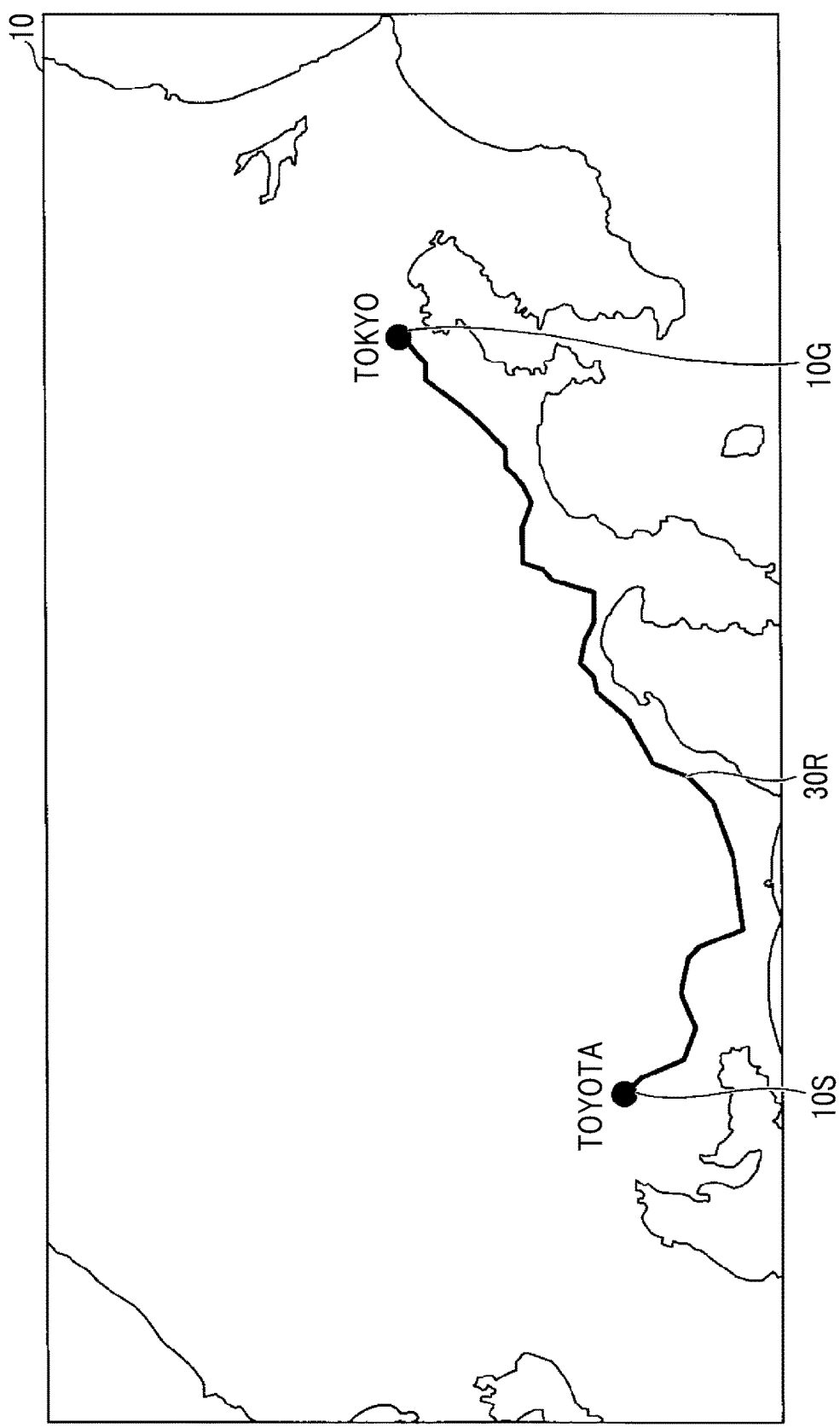
FIG. 6 is a diagram showing an example of the changed route that is generated by the information processing apparatus according to the embodiment of the disclosure.

FIG. 6 is a diagram showing an example of the changed route 30R that is generated by the information processing apparatus according to the embodiment of the disclosure. The changed route 30R shown in FIG. 6 is different from the initial route 10R shown in FIG. 2 in that the avoidance route 10D designated in FIG. 3 is excluded. As above, the smartphone 100 determines the changed route 30R taking into consideration of the avoidance route 10D as the unfavorable route for the passage of the user 50. It is desirable that the changed route 30R is a route where the vehicle is confirmed to be passable. In particular, in the in-vehicle equipment, since in many cases, the user 50 searches for a route where the vehicle is passable, it is desirable that the changed route 30R is a route where the vehicle is confirmed to be passable.

For this reason, it is desirable that the smartphone 100 or the like is in a state where a so-called "passable map" that is a map showing a route where another vehicle is confirmed to be passable can be used.

Returning to FIG. 1, in Step S106, the smartphone 100 outputs the changed route 30R as a guidance route. For example, the smartphone 100 displays the map 10 as shown in FIG. 6.

For example, as shown in FIG. 4, in a case where the passage route 10H is input, the smartphone 100 may generate and output the changed route 30R where the passage route 10H is included. For example, in a case where the passage route 10H is input, the smartphone 100 performs the following processing.

Figure 7A:
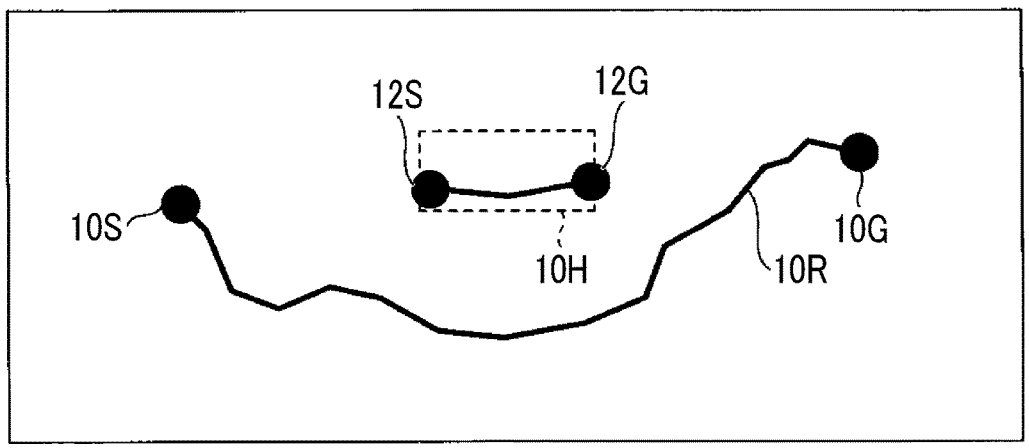
FIG. 7A is a diagram showing an example where the information processing apparatus according to the embodiment of the disclosure searches for a route including a passage route.
Figure 7B:
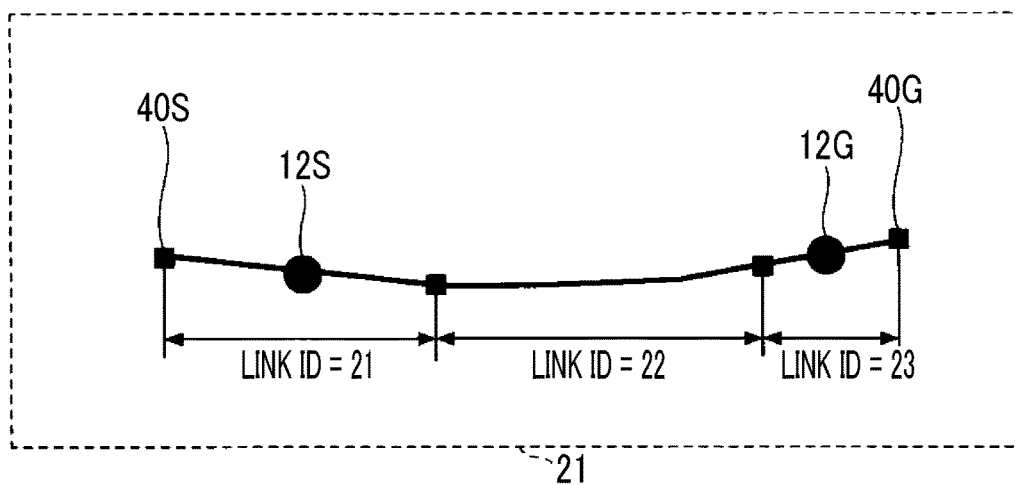
FIG. 7B is a diagram showing an example where the information processing apparatus according to the embodiment of the disclosure searches for a route including a passage route.

FIGS. 7A and 7B are diagram showing an example where the information processing apparatus according to the embodiment of the disclosure searches for a route including the passage route 10H. Hereinafter, an example where the initial route 10R shown in FIG. 7A is searched (Step S102), and the passage route 10H shown in FIG. 7A is designated will be described.

First, the smartphone 100 specifies the passage route 10H. Specifically, as shown in FIG. 7B, the smartphone 100 specifies a link including a passage route start point 12S.

In an example shown in FIG. 7B, the link including the passage route start point 12S is a link of "link ID=21". In the link of "link ID=21", a point closest to the departure place 10S is referred to as a "passage link start point 40S".

Similarly, the smartphone 100 specifies a link including a passage route end point 12G. In the example shown in FIG. 7B, the link including the passage route end point 12G is a link of "link ID=23". In the link of "link ID=23", a point closest to the destination 10G is referred to as a "passage link end point 40G".

Then, in a case where a route with the passage link start point 40S and the passage link end point 40G as a start point and an end point is searched, the smartphone 100 can specify a route (hereinafter, referred to as a "specified route 21") shown in FIG. 7B. Specifically, the example shown in FIG. 7B is an example where the specified route 21 constituted of "link ID=21" to "link ID=23" is searched. The smartphone 100 changes the initial route 10R so as to include the specified route 21 described above as a part. A changed route 31R that is generated by the change described above is, for example, the following route.

Figure 8:
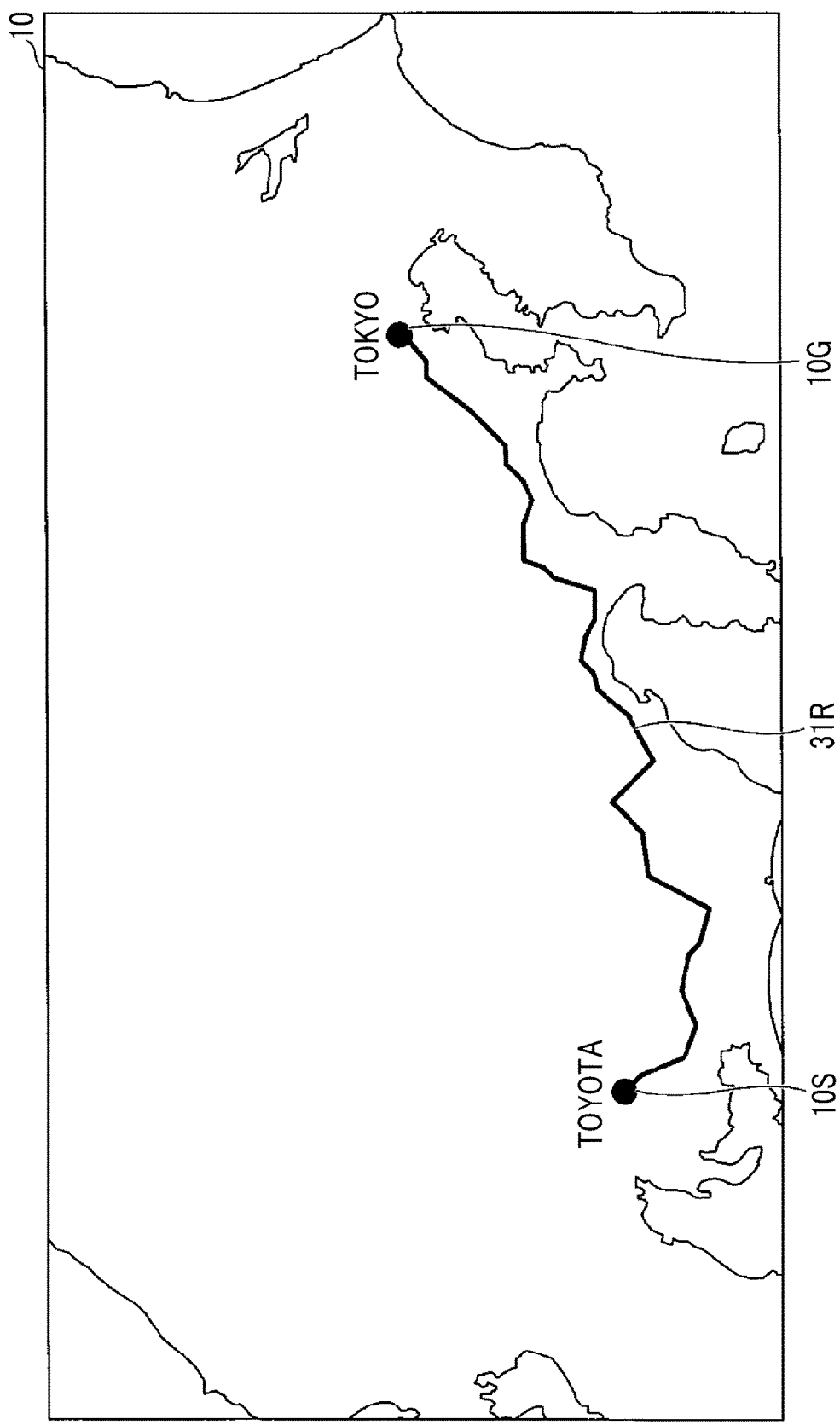
FIG. 8 is a diagram showing a generation example of a changed route taking into consideration a passage route in the information processing apparatus according to the embodiment of the disclosure.

FIG. 8 is a diagram showing a generation example of the changed route 31R taking into consideration of the passage route 10H in the information processing apparatus according to the embodiment of the disclosure. The changed route 31R shown in FIG. 8 is different from the initial route 10R shown in FIG. 2 in that the passage route 10H designated in FIG. 4 is included. As above, the smartphone 100 determines the changed route 31R taking into consideration the passage route 10H favorable for the passage of the user 50. Then, the smartphone 100 determines the determined changed route 31R as a guidance route.

Second Overall Processing Example

The smartphone 100 may perform the following overall processing.

Figure 9:
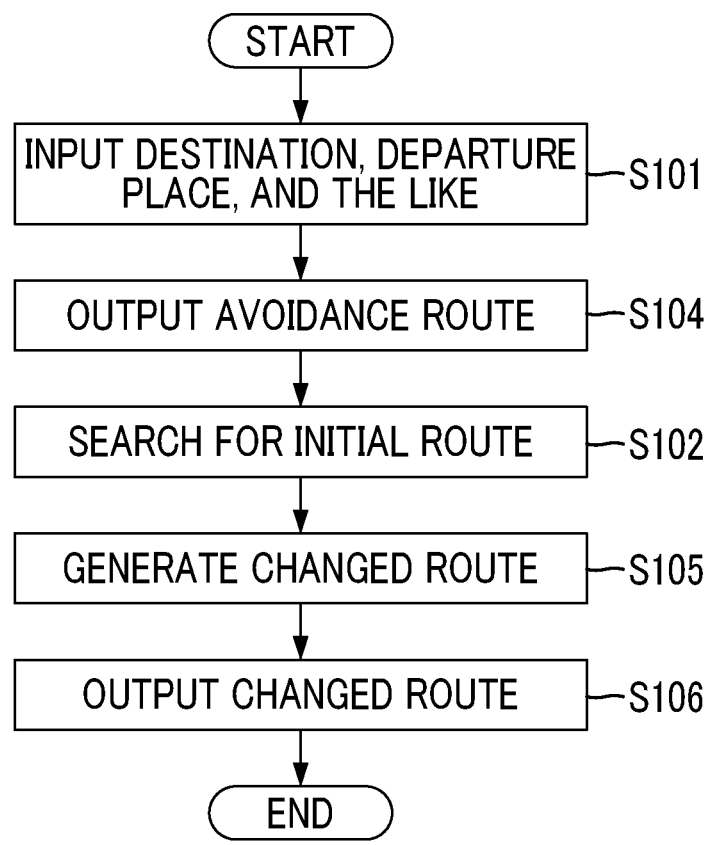
FIG. 9 is a flowchart showing an example of second overall processing in the information processing apparatus according to the embodiment of the disclosure.

FIG. 9 is a flowchart showing an example of second overall processing in the information processing apparatus according to the embodiment of the disclosure. In the drawing, the same processing as in FIG. 1 is represented by the same reference numeral, and description will not be repeated.

The second overall processing is different from the first overall processing in that, before the initial route 10R is searched in Step S102, the avoidance route 10D is designated (Step S104), and the initial route 10R is not output.

Accordingly, in the second overall processing, the user 50 inputs the following settings to the smartphone 100, for example.

Figure 10:
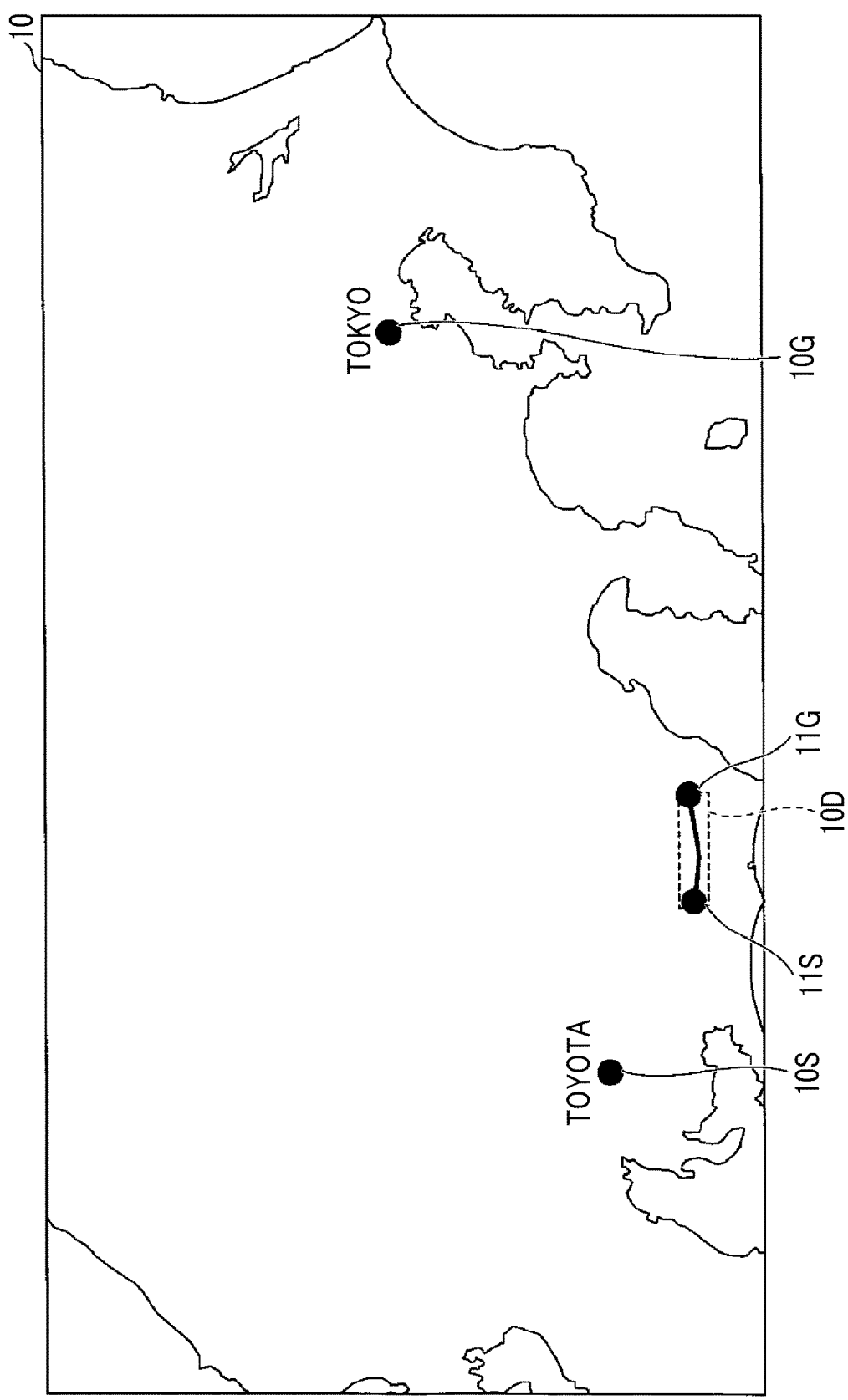
FIG. 10 is a diagram showing an example of an input in the second overall processing in the information processing apparatus according to the embodiment of the disclosure.

FIG. 10 is a diagram showing an example of an input in the second overall processing in the information processing apparatus according to the embodiment of the disclosure. For example, as shown in the drawing, the departure place 10S, the destination 10G and the avoidance route 10D are input to the smartphone 100 by an operation of the user 50. An input method of the departure place 10S, the destination 10G and the avoidance route 10D is, for example, the same method as in the first overall processing. Similarly to the first overall processing, in the second overall processing, the passage route 10H may be input.

In the first overall processing, after the departure place 10S, the destination 10G and the like are input, and the initial route 10R is searched, the smartphone 100 outputs the initial route 10R. After the initial route 10R is output, for example, as shown in FIG. 3, the avoidance route 10D is designated while viewing the initial route 10R.

In the second overall processing, for example, as in FIG. 10, in a case where the departure place 10S and the destination 10G are input, and the avoidance route 10D is designated, the smartphone 100 displays the map 10 shown in FIG. 6.

As in the second overall processing described above, a processing order may be different from that in the first overall processing, and the output of the initial route 10R may be omitted.

Functional Configuration Example

Figure 11:
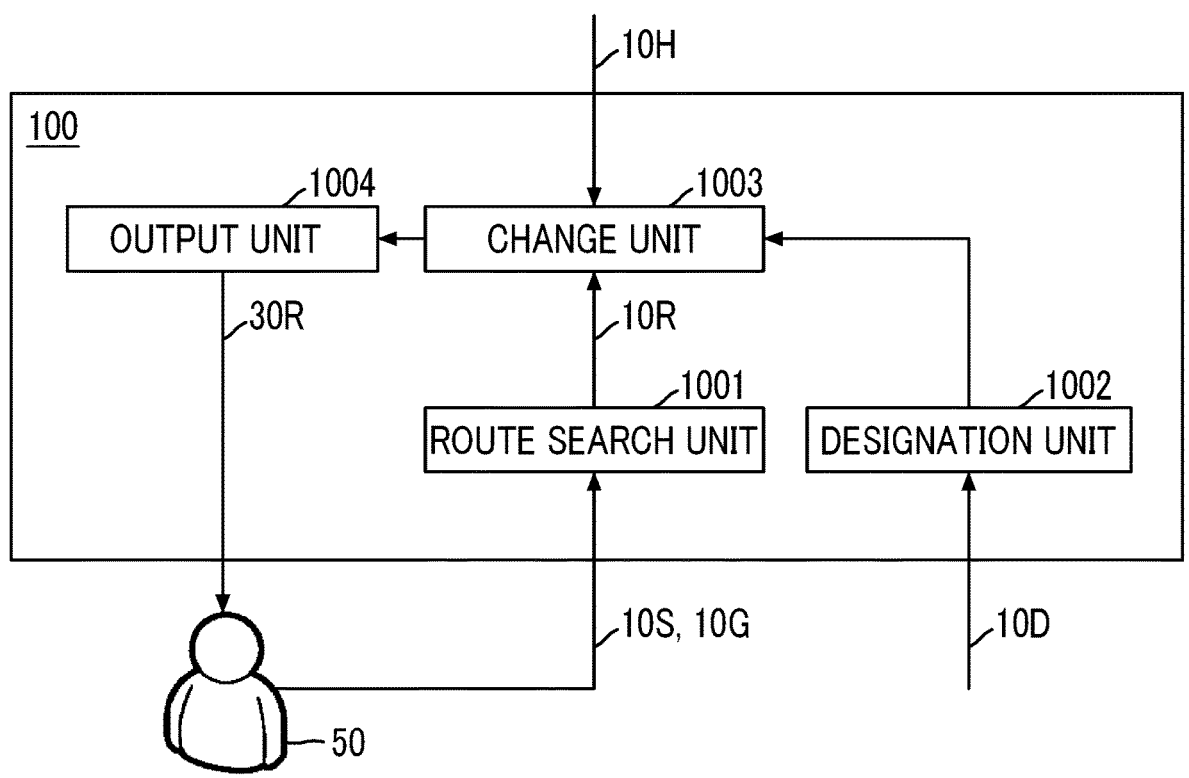
FIG. 11 is a functional block diagram showing a functional configuration example of the information processing apparatus according to the embodiment of the disclosure.

FIG. 11 is a functional block diagram showing a functional configuration example of the information processing apparatus according to the embodiment of the disclosure. As shown in the drawing, for example, the smartphone 100 has a functional configuration including a route search unit 1001, a designation unit 1002, a change unit 1003, and an output unit 1004.

The route search unit 1001 performs a route search procedure for searching for the initial route 10R from the departure place 10S to the destination 10G. For example, the route search unit 1001 is realized by the arithmetic device, the storage device, and a communication device provided in the smartphone 100, a combination thereof, or the like.

The designation unit 1002 performs a designation procedure for designating the avoidance route 10D as the unfavorable route for the passage of the user 50. For example, the designation unit 1002 is realized by the input/output device, the communication device, and the interface provided in the smartphone 100, a combination thereof, or the like.

The change unit 1003 performs a change procedure for excluding the avoidance route 10D from the initial route 10R to generate the changed route 30R. For example, the change unit 1003 is realized by the arithmetic device, the storage device, and the communication device provided in the smartphone 100, a combination thereof, or the like.

The output unit 1004 output the changed route 30R. For example, the output unit 1004 is realized by the input/output device provided in the smartphone 100, or the like.

First, as in Step S101, the destination 10G the departure place 10S, and the like are input to the smartphone 100. In this way, the smartphone 100 can search for the initial route 10R with the route search unit 1001.

In addition, for example, as in FIG. 3 or 10, the smartphone 100 designates the avoidance route 10D (Step S104). Specifically, as the avoidance route 10D, for example, the route shown in FIG. 3 that the user 50 determines with an intuitively understandable operation, such as an operation of tracing the map 10, or the like is designated. The avoidance route 10D may be designated by input of data from the outside, or the like.

The smartphone 100 generates the changed route 30R based on the designated avoidance route 10D with the change unit 1003, for example, as in FIGS. 5A, 5B and 5C (Step S105). In this way, the smartphone 100 can determine the changed route 30R where the avoidance route 10D is excluded taking into consideration the avoidance route 10D as the unfavorable route for the passage of the user 50. The smartphone 100 can determine the changed route 30R as a guidance route and output the changed route 30R to the user 50 with the output unit 1004, for example, as shown in FIG. 6.

For example, in a case where a disaster occurs, it is assumed that there is a route that is determined to be dangerous due to the disaster or a route that a long passage time is spent due to unopened railroad crossing. It is assumed that the user 50 knows the route described above or information relating to the route can be acquired from traffic information or the like. In many cases, the route described above becomes a route that is considered as an unfavorable route for the passage of the user 50. In a case where a route not passing through the avoidance route 10D is searched with the route described above as the avoidance route 10D, the information processing apparatus can guide the user 50 to a guidance route constituted of a safe route, a quickly passable route, or the like.

Modification Examples

The smartphone 100 is not limited to a configuration in which the route specified by the operation of the user 50 of tracing the map 10 with the finger as in FIGS. 3 and 4 is designated as the avoidance route 10D. For example, the smartphone 100 first receives data indicating disaster information, traffic information, and the like from the external device as input. The smartphone 100 can specify, based on data, a route where a vehicle or the like is not passable due to the disaster, a route where an unobstructed view is bad due to weather or the like, a route where a long passage time is spent, or the like. As described above, the smartphone 100 may designate the route indicated by data as the avoidance route 10D.

The avoidance route 10D may be designated, for example, with the link ID or the like.

The passage route 10H and the avoidance route 10D are not limited as being switched and input to different screens as in FIGS. 3 and 4. For example, the passage route 10H and the avoidance route 10D may be different in the type of operation. For example, on the same screen, the passage route 10H may be input with so-called single tap, the avoidance route 10D may be input with so-called double-tap.

In addition, for example, it is assumed that the passage route 10H is input with an operation of tracing from the departure place 10S side toward the destination 10G side on the screen (in the example shown in FIG. 2, from the left side to the right side). The avoidance route 10D is input with an operation of tracing the destination 10G side toward the departure place 10S side on the screen (in the example shown in FIG. 2, from the right side to the left side). As described above, the passage route 10H and the avoidance route 10D are made distinct with a tracing direction or the like.

As above, the passage route 10H and the avoidance route 10D may be made distinct or may be designated in distinction from each other by other methods in which a screen for inputting an operation, an input operation, or the like is different.

The start point and the end point of each route may be designated by other operations than the tracing operation. For example, the start point and the end point may be designated by a long press operation or the like. Any one point of the start point and the end point may be designated by a long press operation or the like.

Other Embodiments

The route is not limited to the route shown on the map 10 described above. For example, the route may be route using means of transportation, such as a rail, other than a vehicle.

A graphical user interface (GUI) is not limited to the shape, type, or size shown in the drawing. That is, a GUI having different shape, type, or size may be provided as long as the GUI can perform the same input or output as the GUI shown in the drawing.

One or more devices, such as the information processing apparatus and the in-vehicle equipment according to the embodiment of the disclosure, may be provided. Specifically, the method of determining a route according to the embodiment of the disclosure may be executed by an information processing system or the like having the information processing apparatus, and a server connected to the information processing apparatus through a network. That is, the information processing system may execute each procedure related to the method of determining a route by redundancy, distribution, parallelism, virtualization, or a combination thereof.

The embodiment according to the disclosure may be realized by a program for causing a computer, such as the information processing apparatus or the information processing system, to execute each procedure related to the method of determining a route. The program can be distributed in a form of being stored in a computer-readable storage medium.

Although the preferred embodiment of the disclosure has been described, the disclosure is not limited to the above-described embodiment, and various modifications and alterations may be made.

In the route determining method according to the first aspect of the disclosure, the designating of the avoidance route may include displaying a map and outputting a portion of the map traced by the user as the avoidance route.

In the route determining method according to the first aspect of the disclosure, the changed route may be a route where a vehicle is confirmed to be passable.

The route determining method according to the first aspect of the disclosure may further include outputting the initial route. After the initial route is output, the designating of the avoidance route may be performed.

The route determining method according to the first aspect of the disclosure may further include inputting the departure place and the destination. After the departure place and the destination are input, the designating of the avoidance route may be performed, and subsequently, the searching of the initial route and the outputting of the changed route may be performed.

In the information processing apparatus according to the second aspect of the disclosure, the computer may be configured to display a map and designate a portion of the map traced by the user as the avoidance route.

In the information processing apparatus according to the second aspect of the disclosure, the changed route may be a route where a vehicle is confirmed to be passable.

In the information processing apparatus according to the second aspect of the disclosure, the computer may be configured to output the searched initial route, and after the initial route is output, designate the avoidance route.

In the information processing apparatus according to the second aspect of the disclosure, the computer may be configured to, when the departure place and the destination are input, designate the avoidance route, and subsequently, search for the initial route and output the changed route.

What is claimed is:

1. A route determining method comprising:
    searching for an initial route as a guidance route from a departure place to a destination;
    designating a route from a start point to an end point traced by a user as an avoidance route;
    designating the avoidance route as an unfavorable route for passage by the user; and
    outputting, in a case where the avoidance route is included in the initial route, a changed route obtained by changing the avoidance route included in the initial route to another route,
    wherein the designating of the avoidance route includes displaying a map and the initial route,
    wherein the designating of the avoidance route includes designating a portion of the initial route traced by the user as the avoidance route.

2. The route determining method according to claim 1, wherein the designating of the avoidance route includes displaying a map and designating a portion of the map traced by the user as the avoidance route.

3. The route determining method according to claim 1, wherein the changed route is a route where a vehicle is confirmed to be passable.

4. The route determining method according to claim 1, further comprising outputting the initial route,
    wherein after the initial route is output, the designating of the avoidance route is performed.

5. The route determining method according to claim 1, further comprising inputting the departure place and the destination, wherein:
    the designating of the avoidance route is performed after the departure place and the destination are input; and
    the searching of the initial route and the outputting of the changed route are performed subsequently.

6. An information processing apparatus comprising a computer configured to:
    search for an initial route as a guidance route from a departure place to a destination;
    designate a route from a start point to an end point traced by a user as an avoidance route;
    designate the avoidance route as an unfavorable route for passage by the user; and
    output, in a case where the avoidance route is included in the initial route, a changed route obtained by changing the avoidance route included in the initial route to another route,
    wherein the designating of the avoidance route includes displaying a map and the initial route,
    wherein the designating of the avoidance route includes designating a portion of the initial route traced by the user as the avoidance route.

7. The information processing apparatus according to claim 6, wherein the computer is configured to display a map and designate a portion of the map traced by the user as the avoidance route.

8. The information processing apparatus according to claim 6, wherein the changed route is a route where a vehicle is confirmed to be passable.

9. The information processing apparatus according to claim 6, wherein the computer is configured to:
    output the searched initial route, and
    designate, after the initial route is output, the avoidance route.

10. The information processing apparatus according to claim 6, wherein the computer is configured to:
    designate, when the departure place and the destination are input, the avoidance route, and
    search for the initial route and output the changed route subsequently.

11. A non-transitory storage medium storing a program for causing a computer to execute a method of determining a route, the program causing the computer to execute
    searching for an initial route as a guidance route from a departure place to a destination;
    designating a route from a start point to an end point traced by a user as an avoidance route;
    designating the avoidance route as an unfavorable route for passage by the user; and
    outputting, in a case where the avoidance route is included in the initial route, a changed route obtained by changing the avoidance route included in the initial route to another route,
    wherein the designating of the avoidance route includes displaying a map and the initial route,
    wherein the designating of the avoidance route includes designating a portion of the initial route traced by the user as the avoidance route.

* * * * *